(12) United States Patent
Catalano et al.

(10) Patent No.: US 11,324,248 B2
(45) Date of Patent: May 10, 2022

(54) PROCESS FOR APPLYING GRANULAR MATERIAL ON AN OUTER SIDE OF A FOOD PRODUCT

(71) Applicant: SOREMARTEC S.A., Senningerberg (LU)

(72) Inventors: Giorgio Catalano, Neustadt (DE); Marco Mollo, Alba (IT)

(73) Assignee: SOREMARTEC S.A., Senningerberg (LU)

( * ) Notice: Subject to any disclaimer, the term of this patent is extended or adjusted under 35 U.S.C. 154(b) by 0 days.

(21) Appl. No.: 16/535,221

(22) Filed: Aug. 8, 2019

(65) Prior Publication Data

US 2020/0046011 A1 Feb. 13, 2020

(30) Foreign Application Priority Data

Aug. 10, 2018 (EP) ..................... 18188412

(51) Int. Cl.
*A23P 30/10* (2016.01)
*A23P 20/12* (2016.01)
(Continued)

(52) U.S. Cl.
CPC ............ *A23P 20/12* (2016.08); *A23G 3/0085* (2013.01); *A23P 20/10* (2016.08); *A23P 30/10* (2016.08)

(58) Field of Classification Search
CPC .. A23G 3/0085; A23G 3/0019; A23G 3/0025; A23G 3/0029; A23G 3/0034; A23G 3/004; A23G 3/0042; A23G 3/008; A23G 3/0082; A23G 3/0236; A23G 3/0252; A23G 3/0263; A23G 3/0273; A23G 3/0289; A23G 3/0294; A23G 3/18; A23G 1/005; A23G 1/0053; A23G 1/0063; A23G 1/0069; A23G 1/0076; A23G 1/0086; A23G 1/20;
(Continued)

(56) References Cited

U.S. PATENT DOCUMENTS 1,444,179 A * 2/1923 Fiala .................... B28B 7/02
249/158
1,507,167 A * 9/1924 Gigliotti ............. A23G 3/0289
425/126.2
(Continued)

FOREIGN PATENT DOCUMENTS

CN 104872349 A * 9/2015
DE 202016102297 U1 * 6/2016 ............. B30B 15/04
JP H084878 Y2 * 4/1993

*Primary Examiner* — Drew E Becker
*Assistant Examiner* — Austin Parker Taylor
(74) *Attorney, Agent, or Firm* — Rothwell, Figg, Ernst & Manbeck, P.C.

(57) ABSTRACT

Described herein is a process for applying granular material on an outer side of a foodstuff product (P). This process comprises the steps of:
  providing a mould (102) having a mould cavity (S') that is delimited, at least partially, by at least one mobile wall (106);
  positioning the product (P) in the mould cavity by setting the outer side (p1) in a position facing and at a distance from the mobile wall;
  introducing granular material in the gap (112) comprised between the mobile wall (106) and the outer side of the product; and
  moving the mobile wall (106) towards the outer side of the product so that it comes to press the granular material against the outer side (p1) of the product (P).

2 Claims, 4 Drawing Sheets

(51) Int. Cl.
*A23P 20/10* (2016.01)
*A23G 3/34* (2006.01)

(58) Field of Classification Search
CPC ........ A23G 1/201; A23G 1/205; A23G 1/207;
A23G 1/208; A23G 1/21; A23G 1/22;
A23G 1/223; A23G 1/226; A23G 9/221;
A23P 30/10; A23P 20/10; A23P 20/12;
A21B 3/13–139; B29C 33/308
USPC .......................... 264/109, 112; 426/289–296
See application file for complete search history.

(56) References Cited

U.S. PATENT DOCUMENTS

| | | | | |
|---|---|---|---|---|
| 2,762,395 | A * | 9/1956 | Lamb | B30B 5/02 92/90 |
| 2,967,493 | A * | 1/1961 | Cloud | A23G 3/2015 426/295 |
| 4,335,147 | A * | 6/1982 | Sollich | A23G 3/0273 426/295 |
| 4,832,307 | A * | 5/1989 | Watanabe | B29C 45/332 249/145 |
| 4,853,170 | A * | 8/1989 | Buhler | B28B 7/183 264/517 |
| 6,021,995 | A * | 2/2000 | Cody | A22C 7/0046 249/155 |
| 2008/0185051 | A1* | 8/2008 | Warnick | F15B 11/028 137/488 |
| 2011/0183049 | A1* | 7/2011 | Simbuerger | A23G 1/0013 426/231 |

* cited by examiner

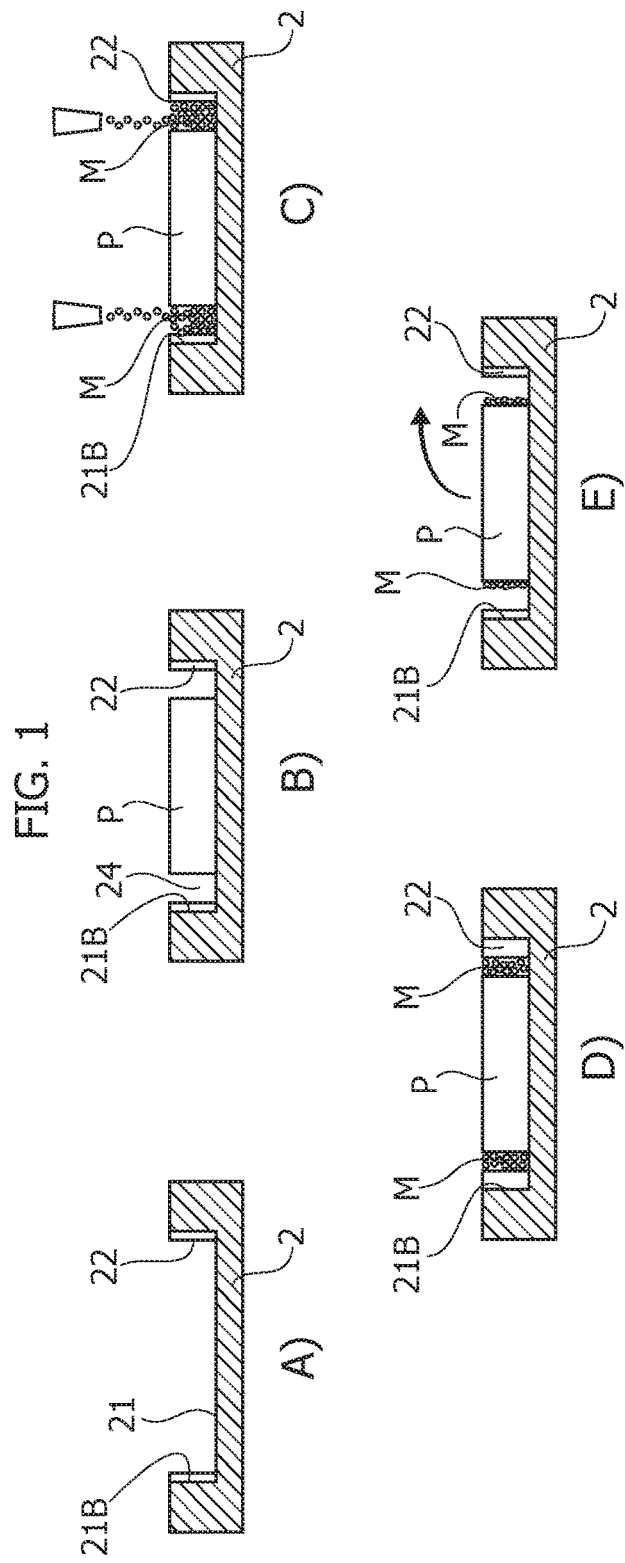
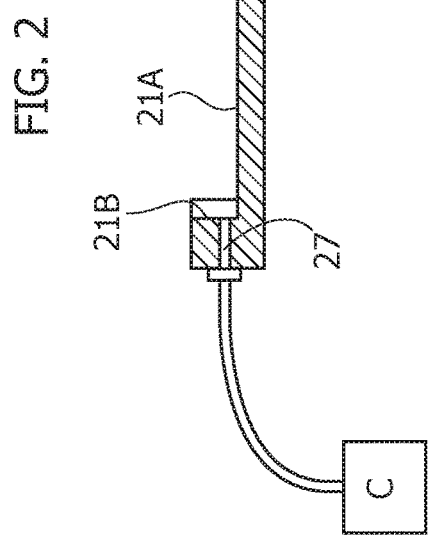

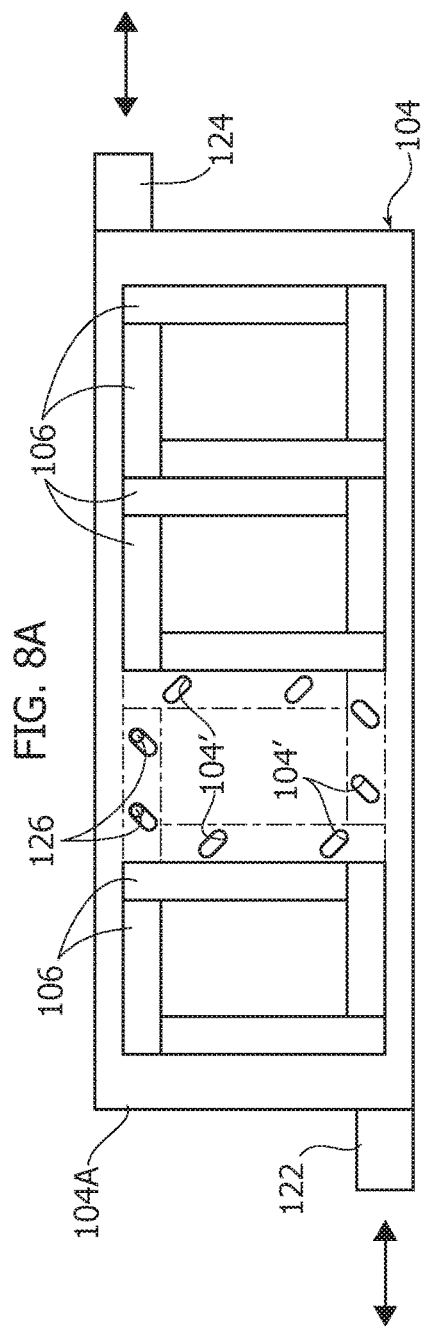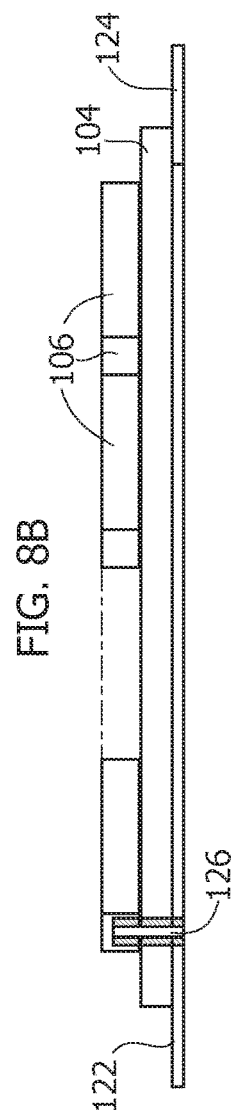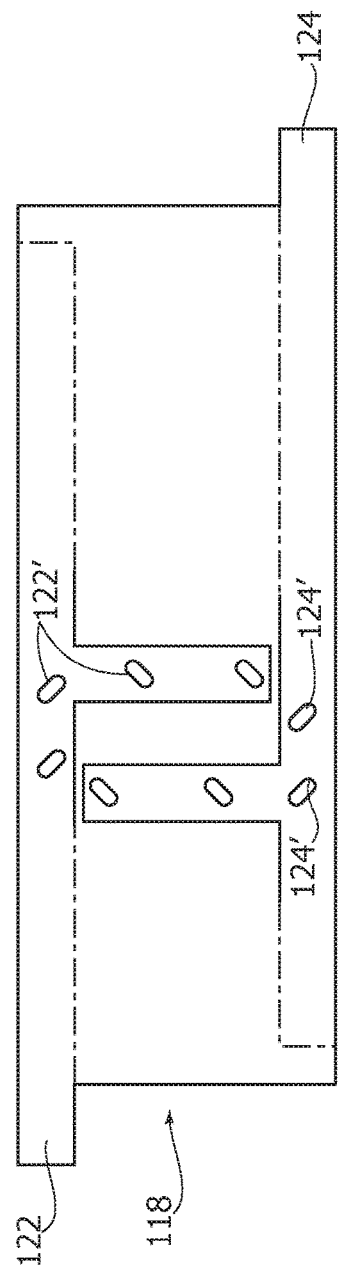

PROCESS FOR APPLYING GRANULAR MATERIAL ON AN OUTER SIDE OF A FOOD PRODUCT

CROSS REFERENCE TO RELATED APPLICATION(S)

This application claims priority to European Application No. 18188412.3, filed Aug. 10, 2018. The entirety of the disclosure of the above-referenced application is incorporated herein by reference.

BACKGROUND OF THE INVENTION

Field of the Invention

The present invention relates to the field of foodstuff products and in particular to those products that are coated at least in part with granular material.

The above configuration is proposed for a wide range of types of products, such as biscuits, snacks, etc.

Description of Related Art

The industrial processes so far known for applying granular material mostly envisage directing onto the individual product a superabundant flow of the granular material, usually in the form of films of material in free fall, so that a part of the material that impinges upon the product will remain adherent to the product itself.

The above type of process can be used for coating the product either completely or only partially. In the latter case, masks are used with purposely provided openings for exposing to the flow only the parts of the product that are to be coated.

Other processes envisage, instead, stirring the products within a rotating container containing the granular material, as for enrobing processes. In this case, the products are coated completely.

In both types of process referred to, the operation conducted is substantially that of bringing the granular material into contact with the product. The material then remains adherent to the product thanks to the presence of substances with adhesive properties that coat the product itself, for example creams, molten chocolate, and the like, in a viscous state.

BRIEF SUMMARY OF THE INVENTION

In this context, the present invention regards a process for applying granular material that will be improved as compared to the known processes referred to above, for the reasons that will become evident in what follows.

The process forming the subject of the present invention is defined by the characteristics of Claim 1. The present invention moreover relates to an apparatus according to Claim 7.

In various embodiments, the process described herein is designed for application of granular material on localised areas of the product.

In various preferred embodiments, application of the granular material is concentrated on edges or perimetral surfaces of a product.

In general, the process described herein can operate on products of any shape. According to the shape of the product, the process may be implemented with different means, as will be illustrated in detail hereinafter.

The claims form an integral part of the technical teaching provided herein in relation to the invention.

BRIEF DESCRIPTION OF THE FIGURES

Further characteristics and advantages of the invention will emerge clearly from the ensuing description with reference to the annexed drawings, which are provided purely by way of non-limiting example and in which:

FIG. 1 is a schematic illustration of successive steps of the process described herein according to a first embodiment;

FIG. 2 is a schematic illustration of an example of apparatus for the above first embodiment;

FIGS. 8A, 8B, and 8C are, respectively, a top plan view, a side view, and a view from beneath, of the apparatus of FIG. 6, partially disassembled.

DETAILED DESCRIPTION OF EMBODIMENTS

Figure 4:
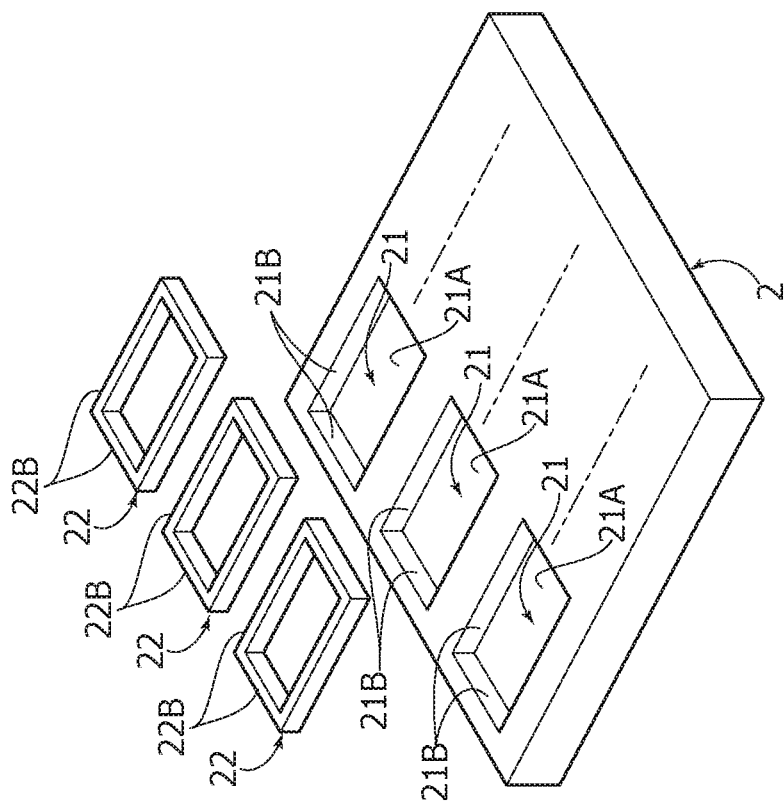
FIG. 4 illustrates an exploded view of the mould of FIG. 3.

In the ensuing description, various specific details are illustrated aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are only provided for convenience and hence do not define the sphere of protection or the scope of the embodiments.

In general, the process described herein has the function of applying granular material on at least one outer side of a foodstuff product.

It comprises the steps of:
providing a mould having a mould cavity that is delimited, at least partially, by at least one mobile wall facing towards the inside of the mould cavity;
positioning the product in the mould cavity by setting the aforesaid outer side in a position facing, and at a distance from, the aforesaid mobile wall;
introducing granular material in the gap comprised between the mobile wall and the outer side of the product; and
moving the mobile wall towards the outer side of the product so that it comes to press the granular material against the aforesaid side.

The process described herein hence envisages positioning the product and the granular material in a pre-established relative position, in which they are already in mutual contact, within the cavity of a mould, and pressing the material against the product through the action of a mobile wall that delimits the cavity of the mould.

The action exerted by the mobile wall causes the granules to penetrate into the product, according to various degrees, on the basis of the characteristics of the product and of the granular material, thereby fixing the granules to the product.

As will be seen in greater detail hereinafter, the aforesaid mobile wall designed to press the granular material against the product can be defined by an inflatable body, or else by a mobile block governed by an actuator device.

For the reasons that will become evident, the use of the inflatable body constitutes a preferred choice in applications of the process on products of complex shapes, for example rounded or irregular shapes.

With reference to the solution that uses an inflatable body, this operates by passing from a configuration at rest to an expanded configuration through injection therein of a fluid under pressure.

In various preferred embodiments, this body is prearranged for expanding in a main direction.

Preferably, the inflatable body is constituted by a casing made of waterproof flexible material, for example rubber, silicone, etc.

Preferably, the action exerted by the inflatable body is subject to a control on the pressure generated inside the body, for example through a pressure sensor.

With reference to the other solution with a mobile block, this is driven in motion towards the product, preferably a motion of translation.

Preferably, the action of the above block is subject to a control of force and/or position, to limit the force exerted on the product.

Preferably, the part of the product that is to come into contact with the granules is constituted by a viscous semi-finished product, such as cream, chocolate, honey, etc.

The granular material in question may, for example, be constituted by nut, coconut, cereals, meringue, etc.

The process described herein may in any case be used with granular material of any type.

Preferred applications regard material constituted by granules having a size less than 0.5 cm.

As will be seen in what follows, the process described herein has been developed with particular reference to products coated with granular material around a closed perimetral edge thereof or else a closed lateral surface thereof.

In any case, the same principles illustrated herein may clearly be applied to products with other configurations, for example products coated with granular material on a single face or side.

Figure 5:
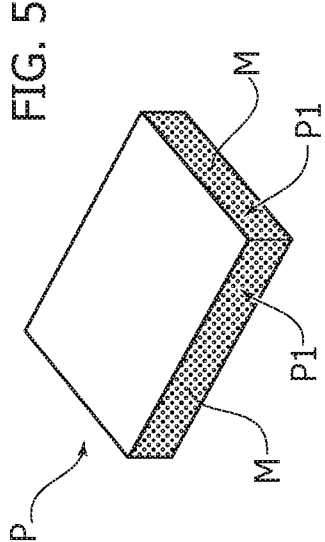
FIG. 5 illustrates an example of product obtained through the process described herein.
Figure 6:
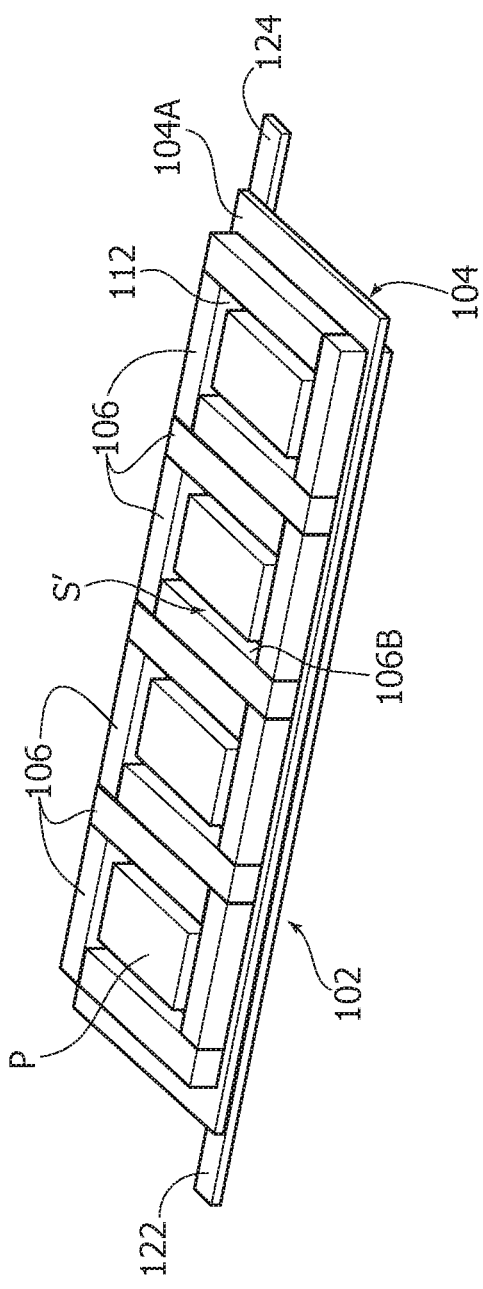
FIG. 6 illustrates an example of apparatus for a second embodiment of the process described herein.
Figure 7:
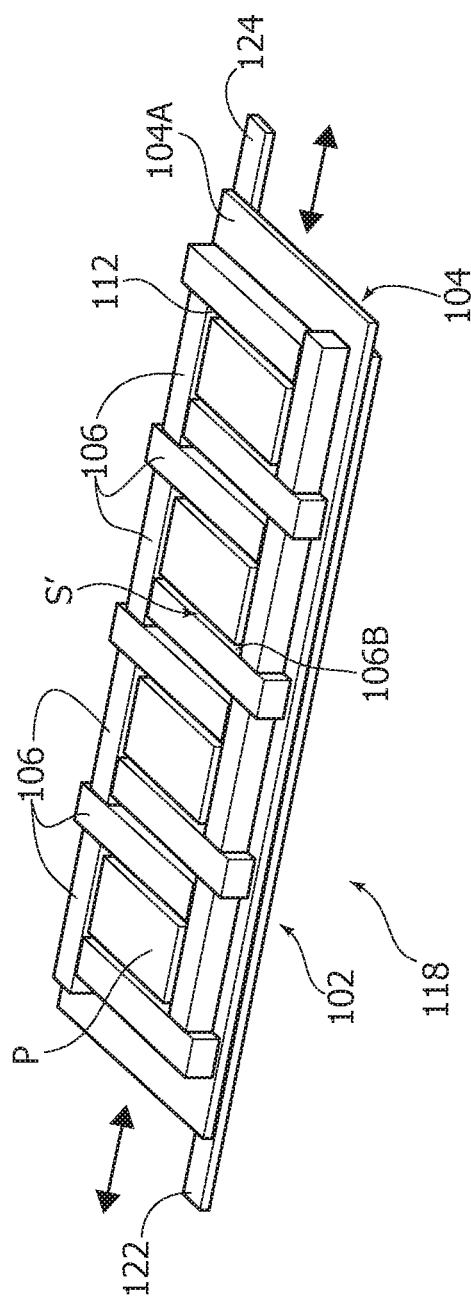
FIG. 7 illustrates the apparatus of FIG. 6 in a different operating condition.

With reference now to the drawings, FIG. 5 illustrates a product P, having a generic parallelepipedal shape, the side edge of which, constituted by the sides p1, is coated with granular material M.

Figure 3:
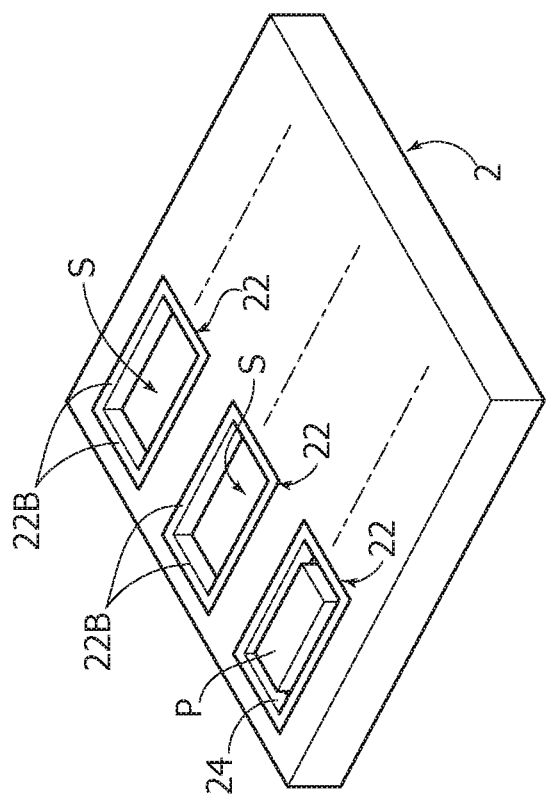
FIG. 3 illustrates am example of mould used in the apparatus of FIG. 2.

With reference to FIGS. 2 to 4, these illustrate an example of apparatus for coating a plurality of the products in question with granular material. This apparatus is realized according to an embodiment in which the inflatable body referred to above is used.

The apparatus in question comprises a mould 2 that has a plurality of cavities 21 for receiving the products P.

The cavities 21 are each delimited by a bottom 21A and by side walls 21B that surround the bottom 21A.

These cavities have in plan view a profile corresponding to that of the products that are to be received, but are substantially larger.

In fact, positioned within the cavities 21 are inflatable bodies 22, which have an annular shape complementary to the inner profile of the cavities 21 identified above.

These bodies are each arranged with their own segments 22B in contact with the walls 21B of the cavities 21, coming to occupy the most peripheral areas thereof and leaving, instead, free an internal space that constitutes the mould cavity S proper for receiving the product P and the granular material M.

More in particular, the bodies 22 are each sized so that, by setting the product P on the bottom 21A in a position substantially centred in the cavity S, between the segments 22B and the corresponding sides p1 of the product P a channel 24 is obtained designed to contain the granular material (FIG. 3).

Incidentally, it will be noted that the width of the channel 24 is such as to contain an amount of granular material far greater than the amount necessary for coating the product, this evidently for simplicity of operation and to guarantee a total covering of the product at the end of the process.

On the other hand, the height of the bodies 22 and hence the depth of the cavities S is clearly a function of the vertical extension of the part of product that is to be coated with granular material. However, it is in general possible to prearrange the mould 2 so that the single cavity S is positioned at a specific height of the product, for example at an intermediate height.

The mould 2 has a series of holes 27 for injection of air into the bodies 22. The latter have respective connectors—not visible in the figures—coupled to the holes 27.

The air is supplied by a compressor assembly C, which is connected to the holes of the mould via flexible tubes.

According to what has been discussed above, the bodies 22 are pre-arranged for passing from a configuration at rest to an expanded configuration as a result of injection of air under pressure. This passage entails an increase in the thickness of the individual segments 22B, thereby determining an action of pressure of the granular material by the aforesaid segments against the sides p1 of the product.

In particular, the bodies 22 are preferably configured so that for each segment 22B the expansion induced by injection of air will take place prevalently, if not exclusively, in a main direction parallel to the bottom 21A of the cavities 21 and orthogonal to the corresponding wall 21B.

Preferably, in operation, expansion of the bodies 22 is subjected to a control on the pressure generated within them. Injection of air is stopped once a pre-set pressure is reached, which will be set in the step of setting-up of the apparatus and will depend upon multiple factors, amongst which the characteristics of the product P and of the granular material M. In various preferred embodiments, the aforesaid pre-set pressure is maintained for a given time.

The above modality of control enables adaptation of the action by the bodies 22 to the specific features and differences (for example, in geometrical terms, dimensional terms, etc.) of the individual products, hence preventing damage to those products that depart from the reference conditions.

The individual body 22 may be constituted by a closed casing or else by a sheath designed to circumscribe an air chamber, together with the walls 21B and/or the bottom 21A of the cavity 21.

As an alternative to the embodiment illustrated, which envisages individual inflatable bodies for the different cavities 21 of the mould, it is possible to provide one or more inflatable bodies in common for different cavities, which come to cover a part or the entire perimeter of each cavity. In this case, the number of inflatable bodies will be less than the total number of the cavities 21 of the mould. Possibly, in some applications, it will also be possible to provide a single inflatable body 22.

Conversely, it is also possible to provide, within each cavity 21, a number of single inflatable bodies equal to the number of segments 22B required.

As regards now the process for applying the granular material to the product P via the apparatus described, as illustrated in FIG. 1, this starts from a condition in which the cavities S are completely free and the bodies 22 are in the resting configuration (step A of FIG. 1).

The products P are then inserted into the cavities S, with the different sides p1 that are made to face the corresponding segments 22B of the bodies 22 and that at the same time are kept separate from the latter by the channel 24 (step B).

Next, the channel 24 is filled with the granular material M until it coats entirely the sides p1 of the product P (step C).

At this point, the bodies 22 are inflated, and their segments 22B thus come to press the granular material against the corresponding sides p1 of the product (step D).

As has been seen, this action fixes the individual granules to the product.

Finally, the products P, which now have a layer of granular material fixed along their sides p1, are picked up for being transferred to a subsequent station, for example a packaging station (step E).

With reference now to FIGS. 6 to 8A-C, these illustrate a different example of apparatus, realized according to an embodiment in which the mobile block referred to previously is used.

According to the above embodiment, the mould, designated by the reference 102, comprises a fixed plate 104, and a plurality of blocks 106, which are mounted on a side 104A of the plate 104, with the possibility of moving, as will be seen in greater detail hereinafter.

The blocks 106 are divided into different groups or formations that delimit, together with the side 104A of the plate 104, respective mould cavities S', which are to receive the product P and the granular material M.

In the example illustrated, groups of four blocks are assembled together so as to delimit respective cavities S' having a rectangular shape in plan view, in particular each block defining with its own inner side 106B a wall of the respective cavity S'.

The cavities S' have dimensions such that, when the product P is positioned at the centre of the cavity, the blocks 106 are located at a distance from the product, thus defining a channel 112 designed to receive the granular material. As already described in relation to the previous embodiment, the width of the channel in question is such as to contain an amount of granular material greater than the amount necessary for coating the individual product. Likewise, the height of the blocks 106, and hence the depth of the cavities S', is clearly a function of the vertical extension of the part of product that is to be coated with granular material.

As mentioned previously, the blocks 106 are mounted with the possibility of moving so as to press the granular material previously introduced into the channel 112 against the corresponding side of the product P.

In various preferred embodiments, the blocks 106 are pre-arranged for moving simultaneously. For this purpose, the blocks 106 are connected to a common driving device 118.

In various preferred embodiments, as in the one illustrated, the blocks 106 move with rectilinear motion, in directions that, with respect to the walls of the respective cavity S' that are defined by them, are not orthogonal, but inclined, and are mutually incident within each pair of adjacent blocks.

In this way, the blocks 106 are each able to approach the corresponding side of the product, without interfering with the adjacent block and remaining in contact with the latter in order to define the corresponding cavity S'.

In various preferred embodiments, the plate 104 has grooves 104' variously inclined according to the directions of movement of the blocks 106, which are engaged by respective pins 126 carried by the blocks 106 themselves, and which guide the movement of the blocks in the aforesaid directions.

The driving device 118 comprises a first driving member 122 and a second driving member 124 that are arranged underneath the plate 104 and are linearly mobile with alternating motion.

The above members have grooves 122', 124' that correspond as regards shape and position to the grooves 104', through which they engage the pins 126 of the blocks 106 and draw the latter in motion. In particular, the two driving members 122, 124 are each connected, through the respective grooves, to two adjacent blocks 106.

The two members 122, 124 are pre-arranged for moving in a synchronised way and in opposite directions. The grooves referred to act as cam means designed to convert the motion of the two members into the movements of the blocks 106 referred to above.

Control of the two members can be performed by respective actuators or else by a single actuator connected to both of the members by way a transmission chain.

The stroke of the two members 122, 124 can be pre-set on the basis of the geometry of the products.

In some embodiments, the movement of the two members 122, 124 is subject to a control of position in which the actuator for controlling the aforesaid members is driven on the basis of a reference datum indicating a pre-set position.

In alternative embodiments, the movement of the two members 122, 124 is instead subject to a control of force in which the actuator for controlling the aforesaid members is driven on the basis of a reference datum indicating a pre-set force.

In both types of control, the pre-set position or force corresponds to a condition in which the blocks 106 press against the product P with a maximum pre-set force.

In the case of the control of force, the force exerted by the two members 122, 124 can be detected through load cells associated thereto. In alternative embodiments, this force is, instead, detected by measuring the intensity of the current absorbed by the actuators that govern the aforesaid members.

In some embodiments, the control of force can be implemented to assist the control of position.

In this way, any possible damage to any products that depart (for example, as regards their geometry and/or dimensions) from the reference conditions is prevented.

The process of application of the granular material M to the product P via the apparatus described basically corresponds to the process described above with reference to FIG. 1. The only difference regards the fact that, in this case, the action of thrust of the granules against the product is exerted by the blocks 106, according to the modalities illustrated, instead of by the inflatable bodies 22.

Finally, in the light of the foregoing, it will be noted how the process and the apparatus described herein can be used for operating on products of any shape. In this connection, with reference to the apparatus, this will envisage mould cavities S appropriately shaped on the basis of the shapes of the products in the various applications. For applications with products of complex shapes (for example, rounded shapes, irregular shapes, etc.), the apparatus is preferably prearranged in the version with inflatable bodies.

Of course, without prejudice to the principle of the invention, the details of construction and the embodiments may vary, even significantly, with respect to what has been illustrated herein purely by way of non-limiting example, without thereby departing from the scope of the invention, as is defined by the annexed claims.

The invention claimed is:

1. A process for applying granular material on at least one outer side of a foodstuff product (P), comprising the steps of:
   providing a mould (102) having a plurality of mould cavities (S') that are delimited, at least partially, by at least one mobile wall (106), wherein each mould cavity (S') is delimited by a bottom;
   positioning a plurality of products (P) in each mould cavity by setting said outer side (p1) in a position facing and at a distance from said mobile wall (106);
   introducing granular material in the gap (112) comprised between said mobile wall (106) and said outer side of each said product; and
   moving said mobile wall (106) towards said outer side of each said product so that it comes to press said granular material against said outer side (p1) of each said product (P), wherein moving said mobile wall (106) towards said outer side of each said product comprises moving said mobile wall (106) in a direction having a component parallel to said bottom,
   applying granular material on a perimetral edge, or on a lateral surface, of each said product (P), wherein said mould (102) comprises at least one mobile block (106) that defines said mobile wall, wherein said movement step further comprises moving said block towards said outer side of each said product via an actuator device (118),
   wherein said perimetral edge or said lateral surface encloses each said product (P),
   wherein said mould comprises a series of mobile blocks (106) assembled together to form an annular profile of a given perimeter,
   wherein said positioning step further comprises positioning each said product so that said mobile blocks will surround said perimetral edge, or said closed lateral surface of each said product, remaining at a distance therefrom, and
   wherein said movement step further comprises moving simultaneously said blocks towards said perimetral edge, or said closed lateral surface, of each said product via said actuator device (118) so as to reduce an extension of said perimeter,
   wherein moving simultaneously said blocks towards said perimetral edge, or said closed lateral surface, of each said product via said actuator device (118) so as to reduce an extension of said perimeter comprises moving a first set of said blocks coupled to a first driving member in a first direction and moving a second set of said blocks coupled to a second driving member in a second direction opposing the first direction.

2. The process according to claim 1, wherein the step of moving said block towards said outer side of said product comprises driving said actuator device on the basis of a reference datum indicating a pre-set position and/or a pre-set force.

* * * * *